(12) United States Patent
Mouri et al.

(10) Patent No.: US 6,533,407 B2
(45) Date of Patent: Mar. 18, 2003

(54) INK, INK JET RECORDING METHOD, INK CARTRIDGE, RECORDING UNIT AND INK JET RECORDING APPARATUS

(75) Inventors: Akihiro Mouri, Tokyo (JP); Katsuhiro Shirota, Kanagawa (JP); Noribumi Koitabashi, Kanagawa (JP); Akio Kashiwazaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/879,899

(22) Filed: Jun. 14, 2001

(65) Prior Publication Data

US 2002/0012035 A1 Jan. 31, 2002

(30) Foreign Application Priority Data

Jun. 21, 2000 (JP) .......................................... 2000-187018

(51) Int. Cl.[7] .................................................. B41J 2/01
(52) U.S. Cl. ........................... 347/100; 347/101; 347/96
(58) Field of Search ................................. 347/100, 101, 347/96, 98; 106/31–58, 31.6, 31.13

(56) References Cited

U.S. PATENT DOCUMENTS

| | | | |
|---|---|---|---|
| 5,509,140 A | 4/1996 | Koitabashi et al. | ............ 347/86 |
| 5,742,311 A | 4/1998 | Koitabashi et al. | ............ 347/86 |
| 5,938,827 A | * 8/1999 | Breton et al. | ............ 106/31.58 |
| 5,963,227 A | 10/1999 | Koitabashi et al. | ............ 347/30 |
| 6,019,828 A | 2/2000 | Rehman | ............ 106/31.58 |
| 6,248,162 B1 | * 6/2001 | Gurdlach et al. | ......... 106/31.58 |

FOREIGN PATENT DOCUMENTS

| | | | |
|---|---|---|---|
| EP | 879857 | 11/1998 | |
| EP | 0879857 A2 | * 11/1998 | .............. B41J/2/01 |
| EP | 962324 | 12/1999 | |

\* cited by examiner

Primary Examiner—John Barlow
Assistant Examiner—Manish Shah
(74) Attorney, Agent, or Firm—Fitzpatrick, Cella, Harper & Scinto

(57) ABSTRACT

The present invention relates to an ink which appropriately spreads on a surface of a recording medium while being suppressed from permeating into the recording medium the thickness direction thereof to form a dot having an appropriate diameter, a high image density in the dot, and excellent outer shape with substantially no feathering, thereby stably forming a high-quality image.

The ink includes a self-dispersible pigment having an anionic group or cationic group bound to the surface thereof directly or through another atomic group, a pigment which can be dispersed in an aqueous medium with a polymeric dispersant, and a polymeric dispersant in an aqueous medium. The ink shows one peak in particle diameter's distribution, the peak positioning at the particle diameter of from 50 to 300 nm.

23 Claims, 6 Drawing Sheets

INK, INK JET RECORDING METHOD, INK CARTRIDGE, RECORDING UNIT AND INK JET RECORDING APPARATUS

BACKGROUND OF THE INVENTION

1. Field of the Invention

The present invention relates to an ink, and particularly to an ink used for ink-jet-system printing. The present invention can be applied to apparatuses, for example, office equipment employing an ink jet recording system, such as a printer, a copying machine, a facsimile, etc., which are capable of recording on various recording media such as paper, a cloth, a leather, a nonwoven fabric, OHP paper, etc. The present invention also relates to an ink cartridge, a recording unit, an ink jet recording apparatus and an ink jet recording method.

2. Description of the Related Art

An ink jet printing method has the advantages of low noise and low running cost, and the advantages that high-speed printing can be performed, the apparatus used can be easily decreased in size, and color printing can easily be performed. This printing method is widely used in a printer, a copying machine, etc. in which the ink used is generally selected from the viewpoints of printability such as discharge performance, fixing performance, and the like, blurring and an optical reflection density of a printed image, print quality such as a coloring property, etc.

It is widely known that inks used for ink jet printing are roughly divided into two types including dye-based ink and pigment-based ink. The pigment-based ink has advantages that the water resistance and light fastness are superior to the dye-based ink, and clear characters can be printed.

A pigment contained in the pigment-based ink is stably dispersed in the ink by using a dispersant such as a polymeric dispersant, or the like. More specifically, the polymeric dispersant is adsorbed on pigment particles to overcome the intermolecular force exerting between the pigment particles, which causes agglomeration of the pigment particles, by using the electric replusive force of the polymeric dispersant, thereby stably dispersing the pigment particles in the ink. Therefore, the polymeric dispersant must be added to the ink according to the amount of the pigment.

In printing on plain paper by an ink jet recording method using such ink, an ink solvent such as water or the like permeates into paper, or evaporates into the air to cause agglomeration of the pigment. In this case, as a behavior on the paper, the force of agglomeration increases as the amount of the polymeric dispersant increases. Therefore, the diameter of an ink dot formed on a printing medium is smaller than that of an ink dot formed with the dye-based ink conventionally used for ink jet printing, and the dot shape is close to a distorted shape immediately after collision with the paper. Therefore, in order to obtain ink dots having a diameter necessary for forming an image having a sufficient record density without causing white stripes or the like, the volume of the ink discharged from an ink jet head must be controlled to be as large as possible. However, this causes a delay in ink fixing to the printing medium in combination with a decrease in permeability into the paper due to the strong force of agglomeration of the pigment particles adsorbing the polymeric dispersant, or cause deterioration in abrasion resistance of a recorded image.

In order to increase the dot diameter and improve the fixing performance, a penetrating agent is possibly contained in the ink for improving permeability of the ink into the printing medium. However, this method causes phenomena undesirable for obtaining a high-quality recorded image, such as deterioration in the dot shape, for example, deterioration in the peripheral shape of a dot such as feathering, ink permeation to the back of paper (so-called "strike through"), etc. Also, a colorant permeates into the printing medium, thereby failing to increase the optical density of a dot even when the dot diameter becomes relatively large.

Furthermore, an ink containing a self-dispersible pigment has been proposed, which can increase the dot diameter due to weak force of agglomeration of the pigment on paper, as compared with ink containing a pigment dispersed by the above-described dispersant. However, the dot diameter cannot be sufficiently increased by this type of ink.

Therefore, an ink and a printing method are in the course of research for further improving properties in order to satisfy various factors which determine the quality of a recorded image, for example, ink fixing performance, the increased diameter of an ink dot, uniformity of density within an ink dot, the high optical density of an ink dot itself, etc., and satisfy stability as an ink, particularly the property that the ink can stably be discharged for ink jet printing.

SUMMARY OF THE INVENTION

In the course of research for further improving the quality of an ink jet recorded image, the inventors found that an ink comprising a mixture of a self-dispersible pigment, a pigment which can be dispersed by a polymeric dispersant, and a polymeric dispersant satisfies high levels of various factors required for improving image quality, and has excellent stability.

Namely, even when the total amount of the polymeric dispersant contained in the ink was decreased, the self-dispersible pigment (first pigment) functions as a dispersant for the pigment (second pigment) which can be dispersed in an aqueous medium by the polymeric dispersant to stably maintain the dispersed state of the pigments in the ink until the ink is discharged from a recording head. On the other hand, in printing on paper with the ink, the dot diameter was increased, as compared with an ink containing the second pigment and the polymeric dispersant for dispersing the second pigment, and an ink containing only the first pigment, and the ink uniformly diffused on the paper with a high optical density (O.D.) and a relatively high rate of fixing.

Although the reason why the above phenomenon is observed is not clear, it is supposed to be due to the following mechanism. The second pigment having the polymeric dispersant adsorbed thereon, and the first pigment electrically repel each other in the ink to weaken the force of agglomeration of the pigments, as compared with at least an ink containing only a pigment dispersed by a polymeric dispersant. In printing on paper with the ink, a colorant in the ink less permeates into the paper in the direction of the thickness thereof because the polymeric dispersant is adsorbed on the second pigment. While in the ink containing the second pigment and the polymeric dispersant, the polymer molecules are rapidly entangled with each other or the polymer is cross-linked between the pigment particles in the (transverse) direction of the paper plane accompanying a decrease in the water content due to permeation of the ink solvent into the paper and evaporation of the solvent, thereby strongly agglomerating the pigment. However, in the ink of the present invention, mixing the first pigment prevents or suppresses entanglement or crosslinking of the polymer, and the strong intermolecular force between the ink pigments is relieved by repulsion between the first pigment and the polymeric dispersant. As a result, the ink easily diffuses in the transverse direction of the paper due to the relief, but the effect of the force of agglomeration of the pigments provides diffusion of the ink with regularity. This can possibly ensure the diameter and circularity of a dot with a small amount of discharge, and achieve conformability of a plurality of dots, i.e., a good smoothing property. This phenomenon on paper becomes particularly significant when the Ka value of the ink obtained by the Bristow's method is less than 1 ml·m$^{-2}$·msec$^{-\frac{1}{2}}$, i.e., when permeability for the printing medium is set to be relatively low. Therefore, this phenomenon is advantageous for improving image quality.

The ink of the present invention has good dispersion stability in an ink tank, as described above, and has the great effect on printability that the dot diameter and O.D. can be increased, and abrasion resistance and dot circularity can be improved.

As a result of further research in serious consideration of the excellent ability of the ink, the inventors found an ink composition capable of improving stability of ink jet discharge performance and the quality of a recorded image.

Accordingly, an object of the present invention is to provide an ink capable of stably recording an image having a high area factor and a high image density.

Another object of the present invention is to provide an ink jet recording method capable of stably forming a high-quality image.

A further object of the present invention is to provide an ink jet recording apparatus capable of stably recording a high-quality image, and an ink cartridge and recording unit which can be used in the ink jet recording apparatus.

In order to achieve the objects, in accordance with first embodiment of the present invention, there is provided an ink comprising a first pigment and a second pigment as colorants which are dispersed in an aqueous medium, and a polymeric dispersant, wherein the first pigment is a self-dispersible pigment having at least one anionic group or cationic group bound to the surface thereof directly or through another atomic group, and the second pigment is dispersible in the aqueous medium with a polymeric dispersant, the polymeric dispersant being at least one of a polymeric dispersant having the same polarity as the group bound to the surface of the first pigment and a nonionic polymeric dispersant, and wherein the ink shows one peak in particle diameter's distribution, the peak positioning at the particle diameter of from 50 to 300 nm.

Namely, as a result of research performed by the inventors in consideration of the above-described characteristics of ink jet recording, with the pigment-based ink comprising the two types of pigments including the self-dispersible pigment (first pigment) and the pigment (second pigment) which can be dispersed in the aqueous medium with the polymeric dispersant, application to ink jet recording could be further optimized by defining the particle diameter distribution of the ink.

In the particle diameter distribution of the pigment-based ink, the particle diameters of the self-dispersible pigment (first pigment) and the pigment (second pigment) which can be dispersed in the aqueous medium by the polymeric dispersant are not simply overlapped with each other. In mixing pigment-based inks having different properties, the particle diameter distribution of the resultant ink is slightly different from the simple sum of the particle diameter distributions of the respective inks. For example, when the particle diameter distributions of two pigments having different particle diameter distributions have peaks close to each other, the particle diameter distribution of the mixed pigment-based ink has one peak. Although the reason why such an ink exhibits the above-described various effects, it is thought that the first and second pigments have particle diameters relatively close to each other to effectively cause the interaction between the first and second pigments. Furthermore, the extreme value of the particle diameters of the ink is controlled in the range of 50 to 300 nm, and more preferably in the range of 50 to 200 nm, to substantially remove fine pigment particles causing deterioration in the optical density, and coarse pigment particles causing deterioration in discharge stability from the ink.

The ink according to the first embodiment of the present invention exhibits good dispersion stability in an ink tank, and the great effect on printability that the dot diameter and the optical density of an image can be improved, and abrasion resistance and dot circularity can be improved.

Further objects, features and advantages of the present invention will become apparent from the following description of the preferred embodiments with reference to the attached drawings.

DESCRIPTION OF THE PREFERRED EMBODIMENTS

Figure 1:
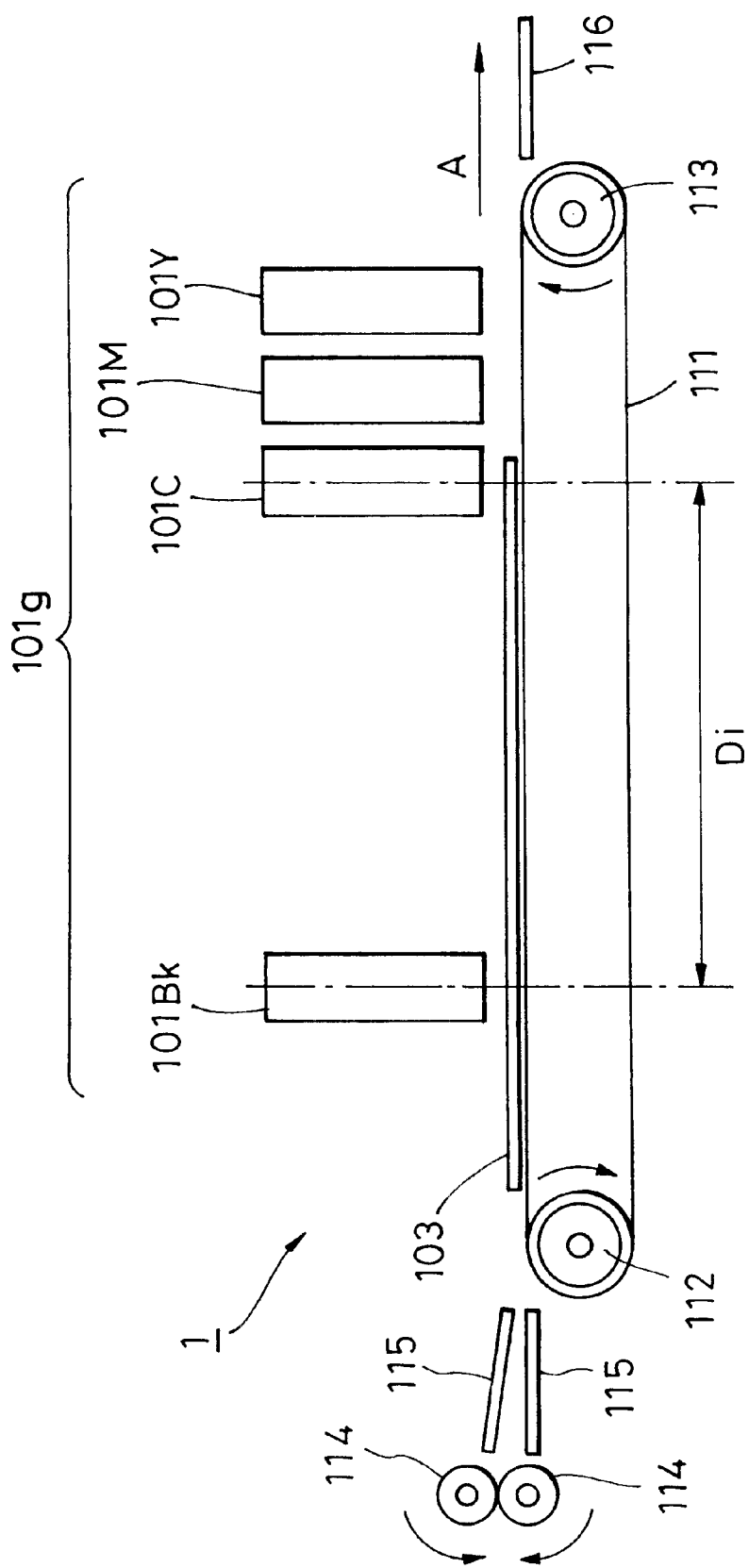
FIG. 1 is a side view showing the schematic construction of an ink jet printing apparatus according to an embodiment of the present invention.

The present invention will be described in detail below on the basis of an ink according to an embodiment which can achieve the objects of the present invention.

An example of an ink which can be used in the present invention comprises, for example, first and second pigments as colorants dispersed in an aqueous medium, wherein the first pigment is a self-dispersible pigment having at least one anionic group or cationic group which is bound to the surface of the first pigment directly or through another atomic group, and the second pigment can be dispersed in the aqueous medium with a polymeric dispersant. The ink further comprises at least one of a polymeric dispersant having the same polarity as the group bound to the surface of the first pigment, and a nonionic polymeric dispersant, and has a distribution function of particle diameters x which has one peak and the peak positions at the particle diameter of from 50 to 300 nm.

The ink is described in further detail below.

(First Pigment)

The self-dispersible pigment means a pigment which stably maintains a dispersion state in a liquid such as water, a water-soluble organic solvent, or a mixture thereof without using a dispersant such as a water-soluble polymeric compound or the like, and which produces no agglomerated pigment particle in the liquid to cause no trouble in normal ink discharge from an orifice by employing an ink jet recording technique.

(Anionic Self-dispersion CB)

As the first pigment, for example, a pigment having at least one anionic group bound to the surface thereof directly or through another atomic group is preferably used. An example of such pigments is carbon black having at least one anionic group bound to the surface directly or through another atomic group.

Examples of the anionic group bound to carbon black include —COOM, —SO$_3$M, PO$_3$HM, —PO$_3$M$_2$, and the like (wherein M represents a hydrogen atom, an alkali metal, ammonium, or organic ammonium).

Examples of the alkali metal M include lithium, sodium, potassium, and examples of organic ammonium M include mono- to tri-methylammonium, mono- to tri-ethylammonium, mono- to tri-methanolammonium, and the like. Of these anionic groups, particularly —COOM and —SO$_3$M are preferred because they have the greatest effect of stabilizing the dispersion state of carbon black.

The above various anionic groups are preferably bound to the surface of carbon black through other atomic groups. Examples of the other atomic groups include a substituted or unsubstituted alkylene group having 1 to 12 carbon atoms, a substituted or unsubstituted phenylene group, and a substituted or unsubstituted naphthylene group. Examples of substituents which may be combined to the phenylene group or naphthylene group include a straight chain or branched chain alkyl group having 1 to 6 carbon atoms, and the like.

Examples of the anionic group bound to the surface of carbon black through another atomic group include —C$_2$H$_4$COOM, —PhSO$_3$M, —PhCOOM, and the like (wherein M is defined as the same as the above, and Ph represents a phenyl group). Of course, the atomic group is not limited to these groups.

Carbon black having the anionic group bound to the surface thereof through another atomic group can be produced by, for example, any of the method of introducing —COONa to the surface of carbon black by, for example, oxidizing commercial carbon black with sodium hypochlorite, the method of combining a —Ar—COONa group (wherein Ar represents an aryl group) to the surface of carbon black by reacting a NH$_2$—Ar—COONa group with nitrous acid to combine the group as a diazonium salt to the carbon black surface. Of course, the production method is not limited to these methods.

(Cationic Self-dispersion CB)

(Cationic Charged CB)

An example of cationic charged carbon black has at least one of the tertiary ammonium groups below which is bound to the surface of carbon black.

—NH$_3$, —N$^+$R$_3$, —SO$_2$NH$_2$, —SO$_2$NHCOR,

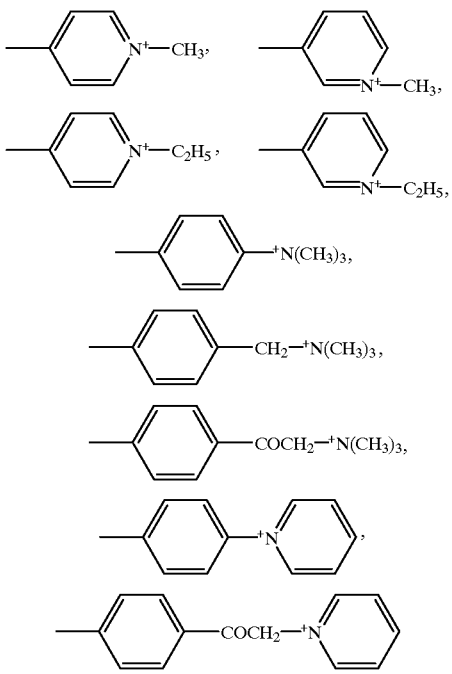

In the above formulae, R represents a straight chain or branched chain alkyl group having 1 to 12 carbon atoms, a substituted or unsubstituted phenyl group, or a substituted or unsubstituted naphthyl group. Examples of substituents of the phenyl group or naphthyl group include a straight chain or branched alkyl group having 1 to 6 carbon atoms, and the like. Therefore, examples of substituents of the substituted phenyl or substituted naphthyl group include a straight chain or branched alkyl group of C$_1$ to C$_6$, and the like. An example of the method of producing self-dispersible carbon black charged cationic by combining the above-described hydrophilic group comprises treating carbon black with 3-amino-N-ethylpyridium bromide to combine a N-ethylpyridyl group having the following structure to carbon black.

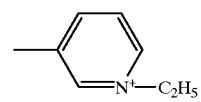

The carbon black charged anionic or cationic by introducing a hydrophilic group to the surface of carbon black has excellent water dispersibility due to ion repulsion, and thus maintains a stable dispersion state in an aqueous ink even when the dispersant or the like is not added.

Any of the above various hydrophilic groups may be bound directly to the surface of carbon black, or indirectly to the surface of carbon black with another atomic group provided between the surface of carbon black and the hydrophilic group. Examples of the other atomic group include a straight chain or branched alkylene group having 1 to 12 carbon atoms, a substituted or unsubstituted phenylene group, and a substituted or unsubstituted naphthylene group. Examples of substituents of the phenylene group or naphthylene group include a straight chain or branched alkyl group having 1 to 6 carbon atoms, and the like. Examples of combinations of the other atomic group and the hydrophilic group include $C_2H_4COOM$, $—Ph—SO_3M$, $—Ph—COOM$, and the like (wherein Ph represents a phenyl group, and M is defined as the same as the above).

The self-dispersible pigment contained in the ink according to this embodiment comprises particles preferably having particle diameters of 50 to 300 nm, more preferably 100 to 250 nm, at a ratio of 80% or more. The method of controlling the particle diameter will be described below.

(Second Pigment)

The second pigment which can be used for the ink of this embodiment can be dispersed in a dispersion medium of the ink, for example, an aqueous medium, by the action of the polymeric dispersant. Namely, it is preferable to use a pigment which cannot be stably dispersed in the aqueous medium unless the polymeric dispersant is adsorbed on the surfaces of the pigment particles. Examples of the pigments include black pigments such as carbon black pigments (e.g., furnace black, lamp black, acetylene black, channel black, etc.) As the carbon black pigment, the following pigments can be used singly or an appropriate combination of two or more.

Raven 7000, Raven 5750, Raven 550, Raven 5000ULTRA, Raven 3500, Raven 2000, Raven 1500, Raven 1250, Raven 1200, Raven 1190ULTRA-11, Raven 1170, and Raven 1255 (produced by Colombia Co., Ltd.), Black Pearls L, Regal 400R, Regal 330R, Regal 660R, Mogul L, Monarch 700, Monarch 800, Monarch 880, Monarch 900, Monarch 1000, Monarch 1100, Monarch 1300, Monarch 1400, Valcan XC-72R (produced by Cabot Co., Ltd.), Color Black FW1, Color Black FW2, Color Black FW2V, Color Black 18, Color Black FW200, Color Black S150, Color Black S160, Color Black S170, Printex 35, Printex U, Printex V, Printex 140U, Printex 140V, Special Black 6, Special Black 5, Special Black 4A, and Special Black 4 (produced by Degussa Co., Ltd.), No. 25, No. 33, No. 40, No. 47, No. 52, No. 900, No. 2300, MCF-88, MA600, MA7, MA8, and MA100 (produced by Mitsubishi Chemical Co., Ltd.)

Other examples of the black pigment include magnetic fine particles of magnetite, ferrite, and the like, titanium black, and the like.

Besides the above black pigment, a blue pigment and a red pigment, and the like can be used.

The total amount of the colorant comprising the first and second pigments is preferably 0.1 to 15% by weight, and more preferably 1 to 10% by weight, of the total weight of the ink. The ratio of the fist pigment to the second pigment is preferably in the range of 5/95 to 97/3, more preferably 10/90 to 95/5, and most preferably 9/1 to 4/6. Alternatively, the ratio is preferably in a range in which the amount of the first pigment is larger than the second pigment. In a case in which the amount of the first pigment is larger than the second pigment, not only the dispersion stability of the ink but also discharge stability of a head, particularly stability including the discharge efficiency and reliability due to less leakage from an orifice surface, are exhibited.

It is also supposed that a uniform thin film is formed by the polymeric dispersant because of the behavior of the ink on paper in which the ink containing a small amount of the second pigment having the polymeric dispersant adsorbed thereon effectively spreads on the surface of the paper. As a result, the abrasion resistance of an image is also improved.

(Polymeric Dispersant)

As the polymeric dispersant for dispersing the second pigment in the aqueous medium, for example, a dispersant which is adsorbed on the surface of the second pigment to stably disperse the second pigment in the aqueous medium is preferably used. Examples of such a polymeric dispersant include an anionic polymeric dispersant, a cationic polymeric dispersant, and a nonionic polymeric dispersant.

(Anionic Polymeric Dispersant)

A polymer of a monomer functioning as a hydrophilic group and a monomer functioning as a hydrophobic group, or a salt thereof can be used. Examples of the monomer functioning as a hydrophilic group include styrenesulfonic acid, $\alpha,\beta$-ethylenically unsaturated carboxylic acids, methacrylic acid, methacrylic acid derivatives, maleic acid, maleic acid derivatives, acrylic acid, acrylic acid derivatives, itaconic acid, itaconic acid derivatives, fumaric acid, fumaric acid derivatives, and the like.

Examples of the monomer functioning as a hydrophobic group include styrene, styrene derivative, vinyltoluene, vinyltoluene derivatives, vinylnaphthalene, vinylnaphthalene derivatives, butadiene, butadiene derivatives, isoprene, isoprene derivatives, ethylene, ethylene derivatives, propylene, propylene derivatives, alkyl acrylates, alkyl methacrylates, and the like.

Examples of the salt of the polymer include alkali metal compounds, compounds of onium ions such as ammonium ion, organic ammonium ion, phosphonium ion, sulfonium ion, oxonium ion, stibonium ions, stannonium ion, iodonium ion, and the like. However, the salt is not limited to these compounds. Furthermore, another compound or group may be appropriately added to the polymer or salt thereof. Examples of other compounds or groups include a polyoxyethylene group, a hydroxyl group, acrylamide, acrylamide derivatives, dimethylaminoethyl methacrylate, ethoxyethyl methacrylate, butoxyethyl methacrylate, ethoxytriethylene methacrylate, methoxypolyethylene glycol methacrylate, vinylpyrrolidone, vinylpyridine, vinyl alcohol, alkyl ether, and the like.

(Cationic Polymeric Dispersant)

As the cationic dispersant, a copolymer of a tertiary amine monomer or quaternary amine monomer and a hydrophobic monomer can be used. Examples of the tertiary amine monomer include N,N-dimethylaminoethyl methacrylate, N,N-dimethylacrylamide, and the like. As the hydrophobic monomer, styrene, a styrene derivative, vinylnaphthalene, or the like can be used. In use of a tertiary amine, sulfuric acid, acetic acid, nitric acid, or the like is used as a compound for forming a salt. Also, a quaternary amine formed by using methyl chloride, dimethyl sulfate, or the like can be used.

(Nonionic Polymeric Dispersant)

Examples of the nonionic polymeric dispersant include polyvinylpyrrolidone, polypropylene glycol, vinylpyrrolidone-vinyl acetate copolymers, and the like.

A combination of the first and second pigments and the polymeric dispersant is appropriately selected, and these materials are dispersed and dissolved in the aqueous medium to obtain the ink of this embodiment. However, in use of a self-dispersible pigment having at least one anionic group bound to the surface thereof directly or through another atomic group as the first pigment, at least one selected from the anionic polymeric dispersants and nonionic polymeric dispersants is preferably combined as the polymeric dispersant from the viewpoint of stability of the ink. For the same reason, in use of a self-dispersible pigment having at least one cationic group bound to the surface thereof directly or through another atomic group as the first pigment, at least one selected from the cationic polymeric dispersants and nonionic polymeric dispersants is preferably combined as the polymeric dispersant with the first pigment.

(Aqueous Medium)

As the aqueous medium used as the dispersion medium for the first and second pigments, water or a mixture of water and a water-soluble organic solvent can be used. Examples of the water-soluble organic solvent include alkyl alcohols having 1 to 5 carbon atoms, such as methyl alcohol, ethyl alcohol, n-propyl alcohol, isopropyl alcohol, n-butyl alcohol, sec-butyl alcohol, tert-butyl alcohol, isobutyl alcohol, n-pentanol, and the like; amides such as dimethylformamide, dimethylacetamide, and the like; ketones or ketoalcohols such as acetone, diacetone alcohol, and the like; ethers such as tetrahydrofuran, dioxane, and the like; oxyethylene or oxypropylene copolymers such as diethylene glycol, triethylene glycol, tetraethylene glycol, dipropylene glycol, tripropylene glycol, polyethylene glycol, polypropylene glycol, and the like; alkylene glycols each containing an alkylene group having 2 to 6 carbon atoms, such as ethylene glycol, propylene glycol, trimethylene glycol, triethylene glycol, 1,2,6-hexanetriol, and the like; glycerin; lower alkyl ethers such as ethylene glycol monomethyl (or ethyl) ether, diethylene glycol monomethyl (or ethyl) ether, tetraethylene glycol monomethyl (or ethyl) ether, and the like; alkanolamines such as monoethanolamine, diethanolamine, triethanolamine, and the like; sulfurane; N-methyl-2-pyrrolidone; 2-pyrrolidone; 1,3-dimethyl-2-imidazolidinone; and the like. These water-soluble organic solvents can be used singly or as a mixture.

The amount of the water-soluble organic solvent in the ink is 0.1 to 60% by weight, and preferably 1 to 30% by weight, of the total weight of the ink.

In the present invention, the properties of the ink for improving image quality can be obtained by controlling the particle diameters of the pigment particles in a predetermined range. More specifically, at least one of the first and second pigments is filtered by ultrafiltration to remove coarse particles and fine particles. The ultrafiltration method uses a membrane made of a material such as polyether sulfon, polyvinylidene chloride, or the like to maintain particles having a molecular weight larger than the cut-off molecular weight of the membrane, and pass smaller particles through the membrane, classifying the pigment particles. As the ultrafilter membrane, a commercial membrane can be used. For example, any of Filtron series ultrafilter membranes having various cut-off molecular weights, which are marketed by Pole Co., German Science Co., etc., can be used. In this way, most (for example, 80% or more) of the first and second pigments are controlled in the range of particle diameters of 50 to 500 nm, preferably 50 to 300 nm, and more preferably 100 to 250 nm. By using such pigments as colorants, the ink of the present invention can be prepared.

In consideration of permeability for a printing medium, the ink of this embodiment containing the above-described components is controlled so that for example, a Ka value is less than 1 (ml·m$^{-2}$·msec$^{-1/2}$), thereby obtaining image dots having a uniform density. The ink permeability for the printing medium will be described below.

It is known that when the ink permeability is shown by an amount V of ink per m$^2$, the amount V of ink permeation (ml/m$^2$=$\mu$m) during the time t after discharge of ink droplets is represented by the following Bristow's equation:

$$V = Vr + Ka(t-tw)^{1/2}$$

(wherein t>tw)

The ink droplets are mostly absorbed by uneven portions (the rough portions of the surface of the printing medium) of the surface immediately after being dropped on the surface of the printing medium, with substantially no permeation into the printing medium. This absorption time is tw (wet time), and the amount of absorption by the uneven portions is Vr. When the elapsed time after dropping of the ink droplets exceeds the wet time tw, the permeation amount V is increased by an amount proportional to the one second power of the time (t−tw). The Ka value is a proportionality coefficient of the increment and indicates a value corresponding to the permeation rate. The Ka value is measured by using a dynamic permeability test device S (produced by Toyo-Seiki Seisakusho) for a liquid according to the Bristow's method. In experiment, PB paper produced by Canon Inc. which is the applicant of this invention, was used as the printing medium (recording paper). The PB paper is recording paper which can be used for both electrophotographic system copying machine and LBP, and an ink jet recording system printer.

The same result can be obtained by using PPC paper as electrophotographic paper produced by Canon Inc.

The Ka value is determined by the type and the amount of the surfactant added. The permeability is increased by adding a nonionic surfactant, for example, ethylene oxide-2,4,7,9-tetramethyl-5-decyl-4,7-diol (trade name "Acetylenol"; produced by Kawaken Fine Chemical Co., Ltd.).

An ink not containing Acetylenol (content of 0%) has low permeability and the properties as additional ink which will be defined below. An ink containing 1% of Acetylenol has the property that it permeates into the recording paper within a short time, and the properties as a high-permeable ink which will be defined below. An ink containing 0.35% of Acetylenol has the properties as a semi-permeable ink intermediate between both types of inks.

TABLE 1

| | Ka value ml·m$^{-2}$·msec$^{-1/2}$ | Acetylenol content (%) | Surface tension (mN/m) |
|---|---|---|---|
| Low-permeable ink | less than 1 | 0 to less than 0.2 | 40 or more |
| Semi-permeable ink | 1 to less than 5 | 0.2 to less than 0.7 | 35 to less than 40 |
| High-permeable ink | 5 or more | 0.7 or more | less than 35 |

Table 1 shows the Ka value, the Acetylenol content (%), surface tension (mN/m) of each of the low permeable ink, the semi-permeable ink and the high-permeable ink. The permeability of each ink for the recording paper used as the printing medium increases as the Ka value increases. Namely, the permeability increases as the surface tension decreases.

The Ka value shown in Table 1 was measured by using the dynamic permeability test device S (manufactured by Toyo Seiki Seisakusho) for a liquid according to the Bristow's method as described above. In experiment, the PB paper produced by Canon Inc. was used as the recording paper. The same result could be obtained by using the PPC paper produced by Canon Inc.

An ink system defined as the high-permeable ink has an Acetylenol content in the range of 0.7% or more in which a good result of permeability can be obtained. The reference for permeability which is imparted to the ink of this embodiment is preferably a Ka value of less than 1.0 (ml·m$^{-2}$·msec$^{-1/2}$), which is the Ka value of the low-permeable ink, and more preferably a Ka value of 0.4 (ml·m$^{-2}$·msec$^{-1/2}$) or less.

(Addition of Dye)

A dye may be further added to the ink of the embodiment. Namely, a dye is further added to the ink containing the first pigment, the second pigment, and the dispersant for dispersing the second pigment to permit the formation of a high-quality image with no cracking between agglomerates of the pigments on the printing medium serving as the recording medium and comprising a resin layer as a coating layer provided on the surface thereof. The reason why the ink further comprising the dye can prevents cracking of the image on the printing medium comprising the resin layer is not known. However, in forming an image on the printing medium with the ink further comprising the dye, the agglomerates of the pigments formed on the printing medium are present in the form of fine particles, and are surrounded by the dye, other portions without the agglomerates being filled with the dye. Although, as described above, the force of agglomeration of the second pigment is relieved by the presence of the first pigment, the force of agglomeration of the second pigment can be further relieved by addition of the dye to effectively prevent the occurrence of nonuniformity such as "cracking" in a printed image, which easily occurs on a recording medium having lower ink absorption than plain paper. Examples of the dye which can be used include an anionic dye, and a cationic dye. It is preferable to use a dye having the same polarity as the group bound to the surface of the first pigment.

(Anionic Dye and Cationic Dye)

Preferable examples of the anionic dye which can be used in the above-mentioned embodiment and which is soluble in the aqueous medium include known acid dyes, direct dyes, reactive dyes, and the like. As the cationic dye, a known basic dye is preferably used. Particularly, a dye having a disazo or trisazo structure as a skeleton structure is preferably used as both types of dyes. Alternatively, two types of dyes having different skeleton structures are preferably used. Besides a black dye, cyan, magenta and yellow dyes may be used as the dye added in a range which causes less change in color tone.

(Amount of Dye Added)

The amount of the dye added is preferably 5% by weight to 60% by weight of the total amount of the ink. However, in order to effectively use the effect of mixing of the first and second pigments, the amount of the dye added is preferably less than 50% by weight. Furthermore, in ink in which printability on plain paper is of importance, the amount of the dye added is preferably 5% by weight to 30% by weight.

In order to form a recording solution of the present invention having desired physical property values, a surfactant, a anti-foaming agent, a preservative, and the like can be added to the above-described components according to demand, and a commercial water-soluble dye can be further added.

Examples of the surfactant include anionic surfactants such as fatty acid salts, higher alcohol sulfuric esters, liquid fatty oil sulfuric esters, alkylallyl sulfonates, and the like; nonionic surfactants such as polyoxyethylene alkyl ethers, polyoxyethylene alkyl esters, polyoxyethylene sorbitan alkyl esters, acetylene alcohols, acetylene glycol, and the like. At least one surfactant can be appropriately selected from these surfactants. The amount of the surfactant used depends upon the dispersant, but is preferably 0.01 to 5% by weight of the total weight of the recording solution.

(Recording Method)

The ink of this embodiment is applied to the printing medium by using known ink applying means to form an image.

In accordance with a preferred embodiment of the present invention, an ink applying method is a known ink jet printing method. Namely, the ink of the present invention is preferably used for a printing system in which the ink is discharged to the printing medium from a printing head to print an image. As the discharge method of the printing head, a known method such as a piezo method or the like can be used. In a preferred embodiment, thermal energy is applied to the ink to produce bubbles in the ink so that the ink is discharged by the pressure of the bubbles.

The amount of the ink discharged from the printing head and adhered to the printing medium is preferably 0.014 pico-liter (pl) per unit area. More specifically, the amount is preferably 70 pl or less with 360 dpi, and 25 pl or less with 600 dpi. This is because the ink of this embodiment can increase the area factor as described above and thus requires only a small amount of the ink adhered, while ink comprising only one pigment as a colorant causes an insufficient area factor and a decrease in the optical density on plain paper in some cases.

In another embodiment of the present invention, there are provided an ink container for an ink cartridge comprising an ink containing portion for containing the ink of the above embodiment, and a recording head comprising the ink containing portion for containing the ink and ink discharging means, which are integrated so that the recording head is detachably provided on an ink jet printer.

An example of a preferred apparatus for recording an image using the ink of the embodiment of the present invention is an apparatus in which thermal energy is applied to the ink contained in the ink containing portion corresponding to a recording signal to produce droplets. This apparatus is described below.

Figure 4:
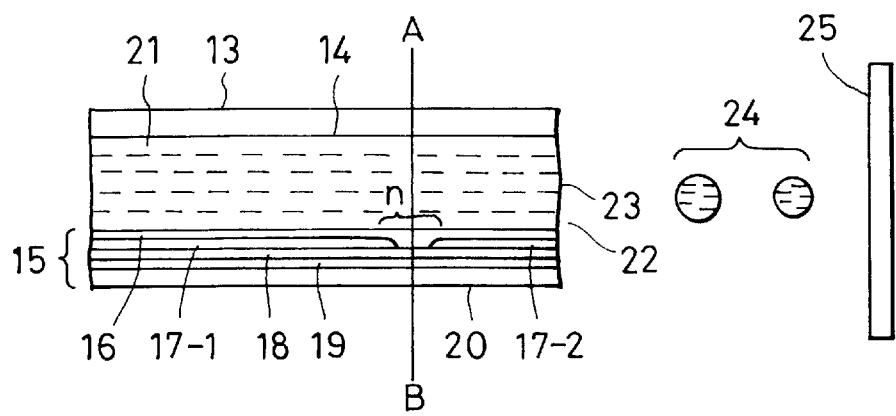
FIG. 4 is a longitudinal sectional view of a head of an ink jet recording apparatus.
Figure 5:
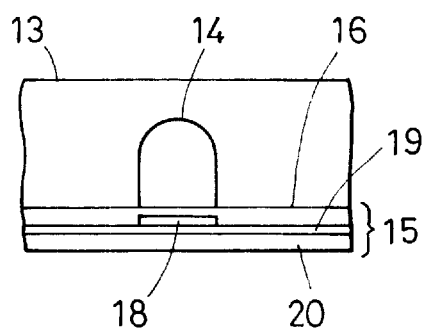
FIG. 5 is a lateral sectional view of a head of an ink jet recording apparatus.
Figure 6:
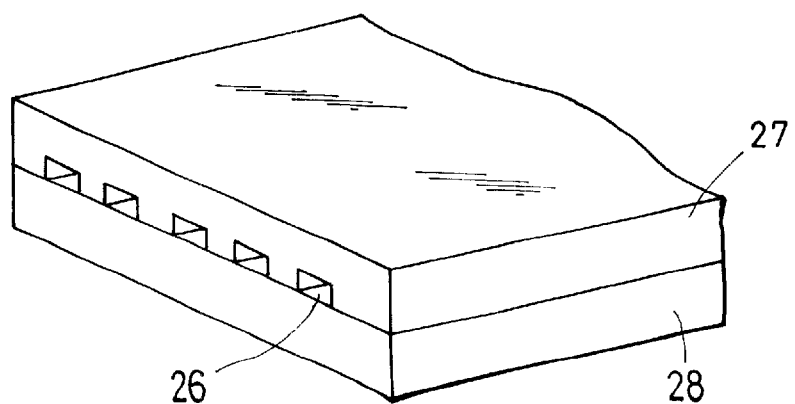
FIG. 6 is a perspective view of the appearance of a multi-head comprising a plurality of the heads shown in FIG. 4.

FIGS. 4, 5 and 6 show examples of the construction of a head which is a principal portion of the apparatus.

A head 13 is obtained by bonding together a glass, ceramic or plastic plate having a groove 14 through which the ink is passed, and a heating head 15 used for thermal recording. Although the figures show-the head, a heating element is not limited to the head. The heating head 15 comprises a protecting film 16 made of silicon oxide, aluminum electrodes 17-1 and 17-2, a heating resistor layer 18 made of nichrome, a heat storage layer 19, and a substrate 20 made of alumina or the like having high heat radiation.

Ink 21 reaches a discharge orifice (fine pore) 22 and forms a meniscus 23 under pressure P.

When an electric signal is applied to the electrodes 17-1 and 17-2, the region of the heating head 15, which is denoted by n, is rapidly heated to produce bubbles in the ink 21 in contact with the region n so that the meniscus 23 is projected under pressure to discharge the ink 21. As a result, the ink 21 flies as recording droplets 24 toward a sheet 25 used in the present invention. FIG. 6 is a drawing showing the appearance of a multi-head comprising a plurality of the heads shown in FIG. 4. The multi-head is formed by bonding together a glass plate 27 having multiple grooves 26 and the same heating head 28 as shown in FIG. 4. FIG. 4 is a sectional view of the head 13 taken along an ink flow passage, and FIG. 5 is a sectional view taken along line A-B of FIG. 4.

Figure 7:
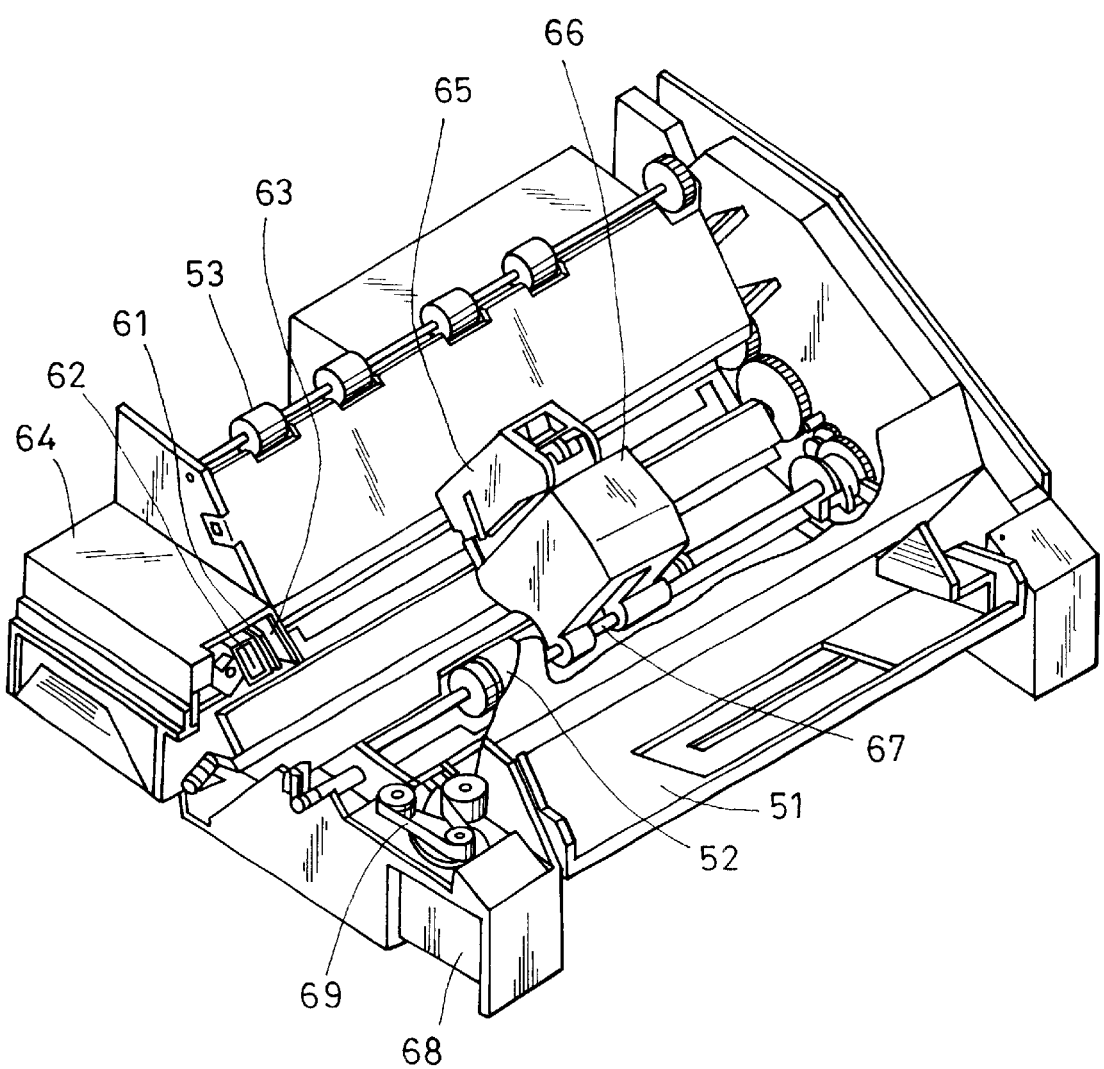
FIG. 7 is a perspective view showing an example of an ink jet recording apparatus.

FIG. 7 shows an example of an ink jet recording apparatus into which the above-described head is incorporated.

In FIG. 7, reference numeral 61 denotes a blade serving as a wiping member, in which one end is a fixed end held by a blade supporting member to form a cantilevered state. The blade 61 is provided adjacent to a recording region of a recording head, and in this example, the blade 61 is held to project into the movement path of the recording head. Reference numeral 62 denotes a cap which is provided at a home position adjacent to the blade 61, and is moved vertically to the movement direction of the recording head to cap the orifice surface in contact with the cap. Reference numeral 63 denotes an absorber provided adjacent to the blade 61 and held to project into the movement path of the recording head. The blade 61, the cap 62 and the absorber 63 constitute a discharge recovery portion 64 so that moisture, dust particles, etc. are removed from the orifice surface by the blade 61 and the absorber 63.

Reference numeral 65 denotes the recording head comprising discharge energy generating means for discharging ink to a sheet opposed to the orifice surface comprising the orifices arranged thereon, and reference numeral 66 denotes a carriage for moving the recording head 65 mounted thereon. The carriage 66 is slidably engaged with a guide shaft 67, and partly connected (not shown) to a belt 69 driven by a motor 68. Therefore, the carriage 66 can be moved within the recording region of the recording head 65 and the region adjacent thereto along the guide shaft 67.

Reference numeral 51 denotes a sheet feeding portion for inserting a sheet, and reference numeral 52 a sheet feed roller driven by a motor not shown in the drawing. In this construction, a sheet is fed to a position opposite to the orifice surface of the recording head, and is expelled to a sheet expelling portion comprising sheet expelling rollers 53 as recording proceeds. In the above-described construction, when the recording head 65 is returned to the home position at the end of recording, the cap 62 of the head recovery portion 64 is retracted from the movement path of the recording head 65, while the blade 61 projects into the movement path. As a result, the orifice surface of the recording head 65 is wiped. In capping the orifice surface of the recording head 65 by the cap 62 in contact therewith, the cap 62 is moved so as to project into the movement path of the recording head 65.

When the recording head 65 is moved from the home position to the recording start position, the cap 62 and the blade 61 are located at the same positions as in wiping. Consequently, the orifice surface of the recording head 65 is also wiped during this movement.

Figure 8:
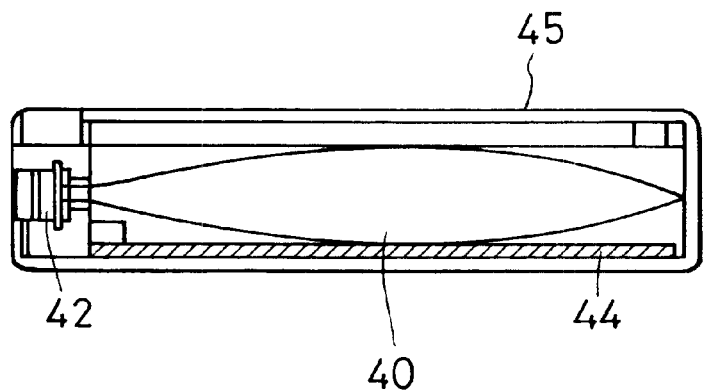
FIG. 8 is a longitudinal sectional view of an ink cartridge.

The recording head is moved to the home position not only at the end of recording and the time of discharge recovery, but also during movement within the recording region for recording. During this movement, the recording head is moved to the home position adjacent to the recording region at predetermined intervals to wipe the orifice surface. FIG. 8 is a drawing showing an example of the ink cartridge 45 containing ink to be supplied to the head through an ink supply member, for example, a tube. In FIG. 8, reference numeral 40 denotes an ink containing portion, for example, an ink bag, which contains ink to be supplied, and which comprises a rubber stopper 42 provided at the tip thereof. A needle (not shown) is inserted into the stopper 42 so that the ink contained in the ink bag 40 can be supplied to the head. Reference numeral 44 denotes an absorber which receives waste ink. In the present invention, the ink containing portion preferably comprises a wetted surface made of polyolefin, particularly polyethylene. The ink jet recording apparatus used in the present invention is not limited to an apparatus in which a head and an ink cartridge are provided as separate units, as described above, and an apparatus in which both members are integrated as shown in FIG. 9 is preferably used.

Figure 9:
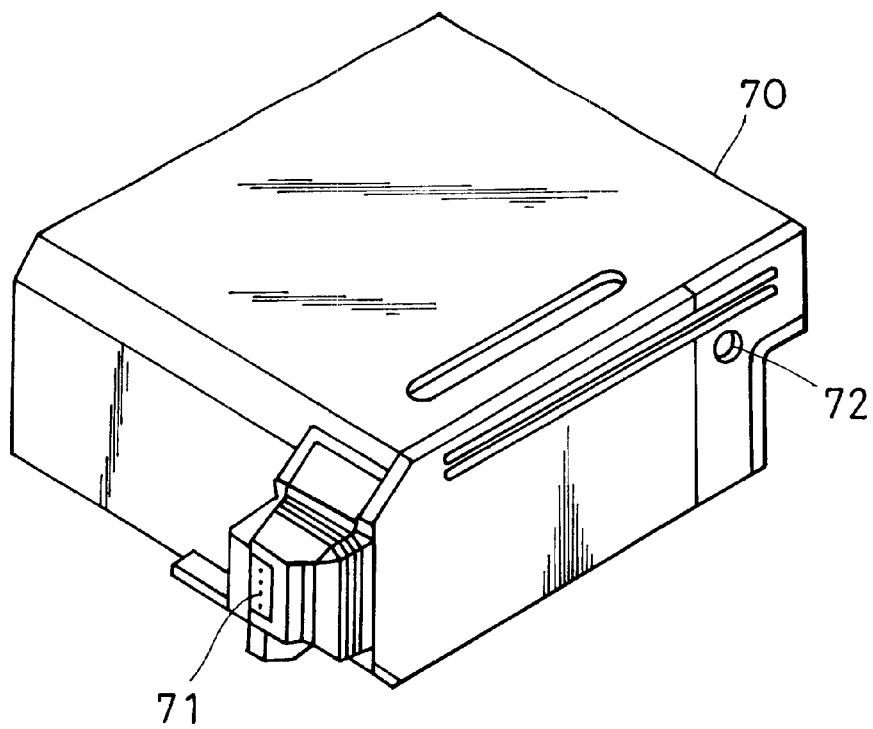
FIG. 9 is a perspective view of a recording unit.

In FIG. 9, reference numeral 70 denotes a recording unit which contains an ink containing portion, for example, an ink absorber, containing ink so that the ink contained in the ink absorber is discharged as ink droplets from a head 71 having a plurality of orifices. As the material of the ink absorber, polyurethane is preferably used. Reference numeral 72 denotes an air communication port for communicating the inside of the recording unit with the air.

(Printing Medium)

The printing medium used in the embodiments of the present invention is not limited, and for example, paper, a nonwoven fabric, OHP paper, leather, etc. can be used. As described above, when the ink of the embodiment of the present invention is applied to the recording medium comprising a resin layer as a coating layer by the ink jet method, cracking can be effectively prevented from occurring in an image formed on the coating layer.

A known example of the printing medium comprising the resin layer as the coating layer comprises paper or a plastic film of polyester or the like and a resin layer provided thereon. The material of the coating layer comprises a water-soluble resin, a water-dispersible resin, or the like as a main component, and a cationic compound, a surfactant, a filler, etc. may be further added to the material.

Examples of the water-soluble resin include synthetic resins such as polyvinyl alcohol; modified polyvinyl alcohol resins such as anion-modified polyvinyl alcohol, cation-modified polyvinyl alcohol, acetal-modified polyvinyl alcohol, and the like; aqueous polyurethane; polyvinyl pyrrolidone; modified polyvinyl pyrrolidone resins such as copolymers of vinyl pyrrolidone and vinyl acetate, copolymers of vinyl pyrrolidone and dimethylaminoethyl methacrylate, copolymers of quaternary vinyl pyrrolidone and dimethylaminoethyl methacrylate, copolymers of vinyl pyrrolidone and methacrylamidopropyl trimethylammonium chloride, and the like; cellulose-based water-soluble resins such as carboxymethyl cellulose, hydroxyethyl cellulose, hydroxypropyl cellulose, and the like; modified cellulose such as cationized hydroxyethyl cellulose and the like; polyesters, polyacrylic acid (ester), melamine resins and modified products thereof; graft copolymers containing at least polyester and polyurethane; and the like; and natural resins such as alubmin, gelatin, casein, starch, cationized starch, gum arabic, sodium alginate, and the like. Examples of the water-dispersible resin include polyvinyl acetate, ethylene-vinyl acetate copolymers, polystyrene, styrene-(meth)acrylate copolymers, (meth)acrylate polymers, vinyl acetate-(meth)acrylic acid (ester) copolymers, poly(meth)acrylamide, (meth)acrylamide copolymers, styrene-isoprene copolymers, styrene-butadiene copolymers, styrene-propylene copolymers, polyvinyl ether, silicon-acrylic copolymers, and the like. Of course, the resins are not limited to these resins.

Besides these components, the material of the coating layer of the printing medium preferably further contains a cationic compound. The cationic compound is not limited as long as it contains a cationic portion in its molecule. Examples of the cationic compound include quaternary ammonium salt type cationic surfactants such as monoalkylammonium chloride, dialkylammonium chloride, tetramethylammonium chloride, trimethylphenylammonium chloride, ethyleneoxide-added ammonium chloride, and the like; amine salt type cationic surfactants; and amphoteric surfactants each containing a cationic portion, such as alkylbetaine, imidazolium betaine, alanine, and the like. Other examples include polymers or oligomers such as modified products of polyacrylamide, copolymers of acrylamide and cationic monomer, polyallyamine, polyamine sulfone, polyvinylamine, polyethyleneimine, polyamide-epichlorohydrin resins, polyvinylpyridinium halides, and the like.

Also, a vinyloxazolidone monomer or a copolymer with another general monomer, a vinylimidazole monomer or a copolymer with another monomer can be used.

Examples of other monomers include methacrylate, acrylate, acrylonitrile, vinyl ether, vinyl acetate, ethylene, styrene, and the like. Also, cationized cellulose may be used.

Although the above cationic compounds are preferably used, the cationic compound is not limited to these compounds. The thickness of the coating layer is preferably in the range of 0.1 g/m² to 100 g/m² in terms of the dry weight, and the coating layer may comprise a single layer or multiple layers such as two layers, three layers, or the like.

As described above, the printing medium comprising the coating layer formed as described above is effective to prevent cracking in use of the ink of the embodiment of the present invention. Besides this effect, the printing medium has the effect of compensating for the defect of a dye having poor wettability for the coating layer because the pigment used has excellent wettability for the coating layer. Namely, by using mixed ink containing the pigments and the dye according to the embodiment of the present invention, it is possible to prevent the occurrence of beading which occurs in use of ink containing only a dye as a colorant.

EXAMPLES

The above-described embodiment is described in detail below with referent to examples.

Example 1

FIG. 1 is a side view showing the schematic construction of a full-line type printing apparatus according to a first embodiment.

The printing apparatus 1 uses an-ink jet printing system in which ink is discharged from a plurality of full-line type printing heads arranged at predetermined positions along the transfer direction (the direction of arrow A shown in the drawing) of a recording medium used as the printing medium. The printing apparatus 1 is operated under control by a control circuit not shown in the drawing.

Each of printing heads 101B$k$, 101C, 101M and 101Y of a head group 101G comprises about 7200 ink orifices arranged in the transverse direction (vertical to the drawing) of the recording sheet transferred in the A direction shown in FIG. 1 so that printing can be performed on a 3A-size recording medium at the maximum.

A recording sheet 103 is transferred in the A direction by rotation of a pair of resist rollers 114 which are driven by a transfer motor, and then transferred onto a transfer belt 111 after register of the leading end while being guided by a pair of guide plates 115. The transfer belt 111 serving as an endless belt is held by two rollers 112 and 113. The roller 113 is rotated to transfer the recording sheet 103. The recording sheet 113 is attracted to the transfer belt 111 due to electrostatic attraction. The roller 113 is rotated in a direction by a driving source such as a motor not shown in the drawing so that the recording sheet 103 is transferred in the A direction. The recording sheet 103 on which recording is performed by the recording head group 101$g$ during transfer on the transfer belt 111 is expelled onto a stacker 116.

In the recording head group 101$g$, the head 101B$k$ contains ink comprising a black pigment as the first pigment (self-dispersible carbon black), the second pigment dispersed in the aqueous medium by the polymeric dispersant, and the polymeric dispersant according to the embodiment of the present invention, and the cyan head 101C, the magenta head 101M and the yellow head 101Y respectively contain color inks. These heads are arranged along the transfer direction A of the recording sheet 103, as shown in FIG. 1. The color inks are respectively discharged from the printing heads to print a black character or a color image.

In this example, the ink orifices of each of the printing heads are arranged at a density of, for example, 600 dpi so that printing is performed with a dot density of 600 dpi in the transfer direction of the recording sheet. Therefore, an image printed in this example has a dot density of 600 dpi in both the row direction and the column direction. Furthermore, the discharge frequency of each of the heads is 4 KHz, and the discharge amount of each head is 15 pl per discharge.

In the ink jet printing apparatus in this example, the distance Di between the black head 101B$k$ and the cyan head 101C is set to be relatively large to prevent color mixing due to blurring at the boundary between a Bk ink printing region and a color ink printing region on the printing medium. However, when the printing medium comprising the coating layer is used, blurring can be suppressed to shorten the distance Di, thereby permitting miniaturization of the apparatus.

The Bk ink used in this example has the following composition. The amount of each component is by "parts by weight", and the total of the components is 100 parts by weight.

| | |
|---|---|
| Pigment dispersed solution 1 | 25 parts |
| Pigment dispersed solution 4 | 25 parts |
| Glycerin | 6 parts |
| Diethylene glycol | 5 parts |
| Acetylenol EH (produced by Kawaken Fine Chemical) | 0.1 part |
| Water | balance |

The pigment dispersed solution 1 was prepared as follows. 300 g of acid carbon black (trade name: MA-77 (pH 3.0, produced by Mitsubishi Kasei Co., Ltd.)) was mixed well with 1000 ml of water, and 450 g of sodium hypochlorite (available chlorine concentration 12%) was added dropwise to the resultant mixture, followed by stirring at 100 to 105° C. for 10 hours. The thus-obtained slurry was filtered with Toyo filter No. 2 (produced by Advantest Co., Ltd.), and the residual pigment particles were sufficiently washed with water. The thus-obtained pigment wet cake was again dispersed in 3000 ml of water, and the resultant dispersion was desalted with a reverse osmosis membrane until a 20 conductivity of 0.2 $\mu$s was obtained. The pigment dispersed solution was further concentrated to a pigment concentration of 10% by weight. Then, the particle diameters were controlled by the ultrafiltration method below to obtain a dispersed solution having a particle diameter distribution in a predetermined range. Namely, two types of ultrafilter membranes were used to remove pigment particles having particle diameters smaller than a desired diameter and pigment particles having particle diameters larger than the desired diameter. More specifically, the pigment dispersed solution was first filtered with the ultrafilter membrane having a cut-off molecular weight of 50 nm to remove fine particles of 50 nm or less, and then filtered with the ultrafilter membrane having a cut-off molecular weight of 0.5 $\mu$m to remove coarse particles of 500 nm or more. By this method, a pigment dispersed solution substantially having a particle diameter distribution of 50 nm to 500 nm was obtained.

By the above-described method, the pigment dispersed solution 1 containing anionic charged self-dispersible carbon black dispersed therein and having hydrophilic —COOH groups directly bound to the surfaces was obtained.

In the present invention, the pigment particle diameter distributions of the pigment dispersed solution and pigment-based ink were measured by DLS-7000 (Otsuka Denshi).

Figure 2A:
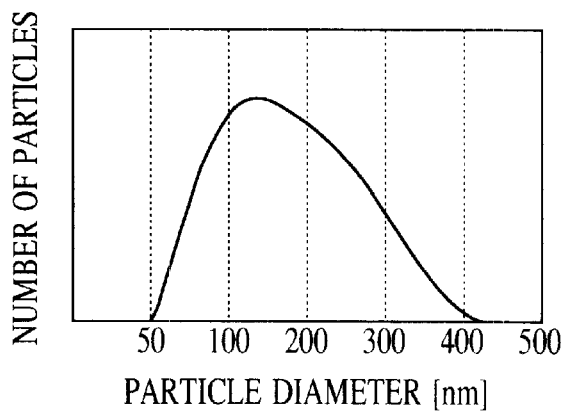
FIGS. 2A to 2C are graphs showing the particle diameter distributions of a pigment dispersion and ink of Example 1 of the present invention.

FIG. 2A shows the particle diameter distribution of the pigment dispersed solution 1 in which the particle diameter at the extreme value (peak) is 130 nm.

The pigment dispersed solution 4 was prepared as follows. 14 parts of styrene-acrylic acid-acrylate copolymer (acid value 180, average molecular weight 12000) as a dispersant, 4 parts of monoethanolamine and 72 parts of water were mixed, and the resultant mixture was heated to 70° C. with a water bath to completely dissolve the resin content. In this case, with a low resin concentration, the resin is not completely dissolved in some cases. Therefore, a high concentration of resin solution may be previously formed, and diluted to prepare a desired resin solution. Then, 10 parts of carbon black (trade name: MCF-88, pH 8.0, produced by Mitsubishi Chemical Co., Ltd.), which cannot be dispersed in an aqueous medium unless a dispersant is added, was added to the solution, and pre-mixed for 30 minutes under the conditions below. Then, the operation below was performed to obtain the pigment dispersed solution 4 in which the carbon black (MCF-88) was dispersed by the dispersant.

Dispersing machine: Side grinder (produced by Igarashi Kikai)
Grinding medium: Zirconia beads having a diameter of 1 mm
Filling rate of grinding medium: 50% (by volume)
Grinding time: 3 hours
Centrifugation (12000 rpm, 20 minutes)

Figure 2B:
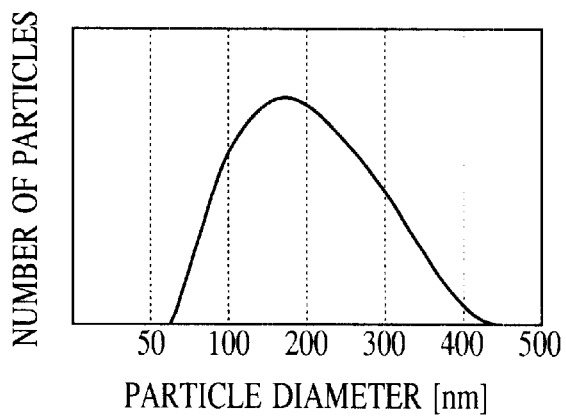

The thus-obtained dispersed solution was further filtered by the same ultrafiltration as the pigment dispersed solution 1 to obtain the pigment dispersed solution 4 having a particle diameter distribution in a predetermined range. FIG. 2B shows the particle diameter distribution of the pigment dispersed solution 4 in which the particle diameter at the extreme value is 170 nm.

Figure 2C:
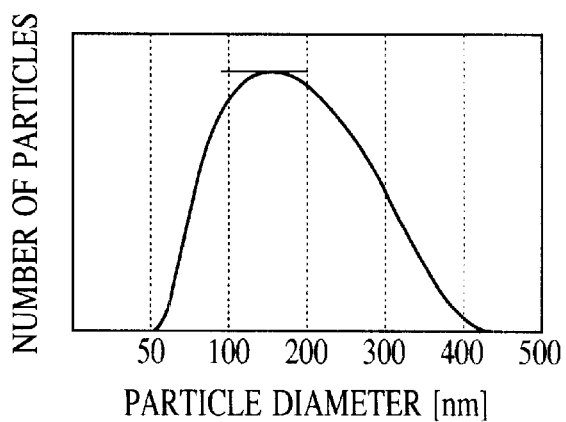

FIG. 2C shows the particle diameter distribution of a pigment-based ink obtained from the pigment dispersed solutions 1 and 4 which has one extreme value, and exhibits a particle diameter of 145 nm at the extreme value (peak).

The ink tank of the ink jet printing apparatus was filled with the ink for recording an image. The formed image had a large dot diameter and a uniform high optical density, good abrasion resistance, good dot circularity, and no white stripe. The image quality of the initial image was kept substantially constant during the recording process.

Example 2

As another example of the Bk ink, ink having the following components can be used.

| | |
|---|---|
| Pigment dispersed solution 3 | 18 parts |
| Pigment dispersed solution 4 | 1 part |
| C. I. Direct Blue 199 | 1 part |
| Glycerin | 6 parts |
| Diethylene glycol | 5 parts |
| Water | balance |

The pigment dispersed solution 3 was prepared as follows.

1.58 g of anthranilic acid was added to a solution of 5 g of concentrated hydrochloric acid in 5.3 g of water at 5° C. The resultant solution was maintained at 10° C. or less by stirring in an ice bath, and a solution obtained by 1.78 g of sodium nitrite in 8.7 g of water at 5° C. was added to the solution. After the resultant mixture was further stirred for 15 minutes, 20 g of carbon black having a surface area of 320 $m^2/g$ and a DBP oil absorption of 120 ml/100 g was mixed with the mixture, followed by further stirring for 15 minutes. Then, the resultant slurry was filtered with Toyo filter No. 2 (produced by Advantest Co., Ltd.), and the residual pigment particles were sufficiently washed with water and then dried in an oven at 110° C. Then, water was added to the pigment to prepare a pigment aqueous solution having a pigment concentration of 10% by weight. The thus-obtained dispersed solution was filtered by the same ultrafiltration as Example 1 to obtain a pigment dispersed solution having a particle diameter distribution in a predetermined range. By the above-described method, the pigment dispersed solution 3 was obtained, in which cationic charged self-dispersible carbon black having hydroxyl groups bound to the surfaces through phenyl groups, as shown by the following formula. The pigment dispersed solution 4 was prepared by the same method as Example 1.

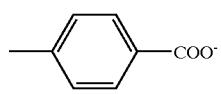

Figure 3D:
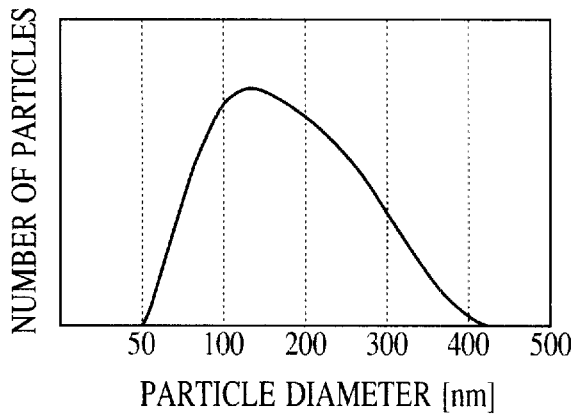
FIGS. 3D to 3F are graphs showing the particle diameter distributions of a pigment dispersion and ink of Example 2 of the present invention.
Figure 3E:
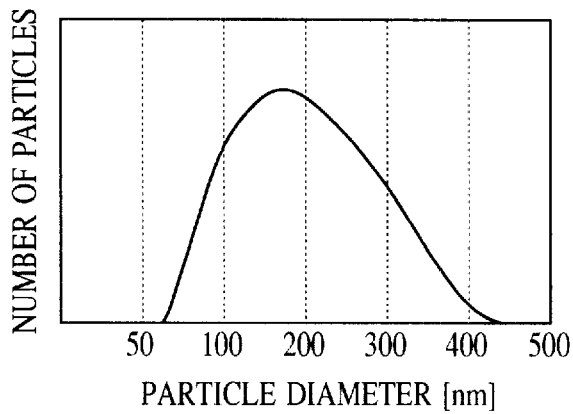

FIG. 3D shows the particle diameter distribution of the pigment dispersed solution 3 in which the particle diameter at the extreme value is 120 nm. FIG. 3E shows the particle diameter distribution of the pigment dispersed solution 4 in which the particle diameter at the extreme value is 170 nm.

Figure 3F:
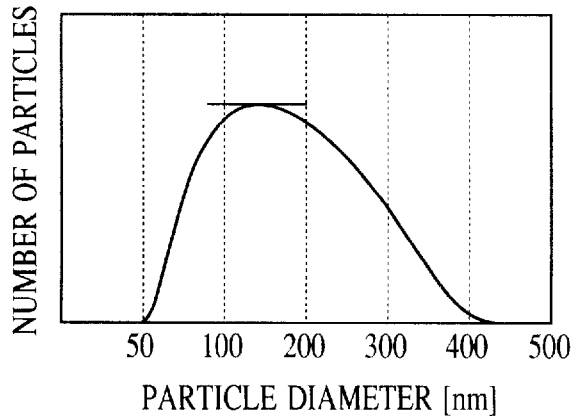

FIG. 3F shows the particle diameter distribution of a pigment ink obtained from the pigment dispersed solutions 3 and 4, which has one extreme value, and a particle diameter of 135 nm at the extreme value.

The ink tank of the ink jet printing apparatus was filled with the ink for recording a plurality of images. The ink discharge stability was good, and the images formed at the initial stage and after continuous printing had a large dot diameter and a uniform high optical density, good abrasion resistance, good dot circularity, and no white stripe. The image quality of the initial image was kept substantially constant during the recording process.

Comparative Example 1

As a comparative example for the above examples 1 and 2, ink comprising the following components was prepared using only the pigment dispersed solution 4 prepared by the same method as Example 1.

| | |
|---|---|
| Pigment dispersed solution 4 | 50 parts |
| Ethylene glycol | 8 parts |
| Glycerin | 5 parts |
| Isopropyl alcohol | 33 parts |

The ink tank of the ink jet printing apparatus was filled with the ink for recording a plurality of images. The formed dots did not sufficiently spread as compared with the above-described examples, and the edge linearity of the peripheral shape of a linear image deteriorated as compared with the images obtained in the above examples. Also the optical density of the images deteriorated as compared with the images formed in the above examples.

As seen from the above description, in accordance with an embodiment of the present invention, ink comprising a self-dispersible pigment (first pigment), a pigment (second pigment) which cannot be dispersed in an aqueous medium until a dispersant is added, and the dispersant has excellent conservation because the first pigment itself functions as a dispersant for the second pigment to stably disperse the second pigment in the ink even when the amount of the dispersant is small. On the other hand, for example, when the ink is used for printing, agglomeration of the pigments due to interaction between the second pigment and the dispersant on the recording medium is relieved by the first pigment. Therefore, the pigment agglomerates are uniformly dispersed as fine particles in an ink dot, and the ink appropriately spread to form a large dot having a uniform image density distribution and excellent peripheral shape and outer shape with substantially no feathering. Furthermore, in this embodiment, the above-described effect based on the interaction between the first pigment and the second pigment can be possibly effectively achieved. This is possibly due to the fact that the first and second pigments have sizes close to each other.

In the ink comprising the first pigment, the second pigment, the dispersant and a dye according to another embodiment of the present invention, agglomeration of the pigments is relieved by the dye to form fine particles of the pigment agglomerates on a recording medium. On the other hand, the fine particles of the pigments are surrounded by the dye to suppress nonuniformity of a printed image as a whole, which is caused by agglomeration. As a result, in ink jet printing on a printing medium having poor ink absorptivity, the occurrence of "cracking" in ink dots can be effectively inhibited or presented.

In the specification, "parts" or "%" is by weight unless otherwise specified.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An ink comprising a first pigment and a second pigment as colorants which are dispersed in an aqueous medium, and a polymeric dispersant;

wherein the first pigment is a self-dispersible pigment having at least one anionic group or cationic group bound to the surface thereof directly or through another atomic group; and the second pigment is dispersible in the aqueous medium with a polymeric dispersant, the polymeric dispersant being at least one of a polymeric dispersant having the same polarity as the group bound to the surface of the first pigment and a non-ionic polymeric dispersant; and wherein the ink shows only one peak in particle diameter's distribution, the peak positioning at the particle diameter of from 50 to 300 nm.

2. An ink according to claim 1, wherein the peak positions at the particle diameter of from 50 to 200 nm.

3. An ink according to claim 1, wherein the anionic group bound to the surface of the pigment is at least one selected from the group consisting of —COOM, —SO$_3$M, —PO$_3$HM and —PO$_3$M$_2$ wherein M represents a hydrogen atom, an alkali metal, ammonium or organic ammonium.

4. An ink according to claim 1, wherein the other atomic group is a substituted or unsubstituted alkylene group having 1 to 12 carbon atoms, a substituted or unsubstituted phenylene group, or a substituted or unsubstituted naphthylene group.

5. An ink according to any one of claims 1 to 4, wherein 80% or more of the first pigment has a particle diameter of 50 to 300 nm.

6. An ink according to claim 5, wherein 80% or more of the first pigment has a particle diameter of 100 to 250 nm.

7. An ink according to any one of claims 1 to 4, wherein the second pigment is dispersed by adsorbing the polymeric dispersant on the surface thereof.

8. An ink according to any one of claims 1 to 4, wherein the polymeric dispersant is at least one of a sulfonic acid type polymeric dispersant and a carboxylic acid type polymeric dispersant.

9. An ink according to any one of claims 1 to 4, wherein the second pigment contains at least two types of pigments having different structures.

10. An ink according to any one of claims 1 to 4, wherein the ratio of the first pigment to the second pigment is in the range of 5/95 to 97/3.

11. An ink according to claim 10, wherein the ratio of the first pigment to the second pigment is in the range of 10/90 to 95/5.

12. An ink according to claim 11, wherein the ratio of the first pigment to the second pigment is in the range of 9/1 to 4/6.

13. An ink according to any one of claims 1 to 4, wherein the amount of the first pigment is larger than that of the second pigment.

14. An ink according to any one of claims 1 to 4, wherein at least one of the first and second pigments is carbon black.

15. An ink according to any one of claims 1 to 4, further comprising a dye having the same polarity as the group bound to the surface of the first pigment.

16. An ink according to claim 15, wherein the dye is an anionic dye or a cationic dye.

17. An ink according to claim 16, wherein the anionic dye is at least one selected from the group consisting of acid dyes, direct dyes and reactive dyes.

18. An ink according to claim 17, wherein the anionic dye has a disazo skeleton or trisazo skeleton.

19. An ink according to any one of claims 1 to 4, wherein the ink is used for ink jet recording.

20. An ink cartridge comprising an ink containing portion which contains an ink according to any one of claims 1 to 4.

21. A recording unit comprising an ink containing portion which contains an ink according to claim 19, and an ink jet head for discharging the ink.

22. An ink jet recording apparatus comprising an ink containing portion which contains an ink according to claim 19, and a recording head for discharging the ink.

23. An ink jet recording method comprising the step of discharging an ink according to claim 19 onto a recording medium by an ink jet method.

* * * * *

UNITED STATES PATENT AND TRADEMARK OFFICE
CERTIFICATE OF CORRECTION

PATENT NO.   : 6,533,407 B2
DATED        : March 18, 2003
INVENTOR(S)  : Akihiro Mouri et al.

It is certified that error appears in the above-identified patent and that said Letters Patent is hereby corrected as shown below:

Column 3,
Line 35, "first" should read -- a first --.

Column 11,
Line 3, "prevents" should read -- prevent --; and
Line 43, the first occurrence of "a" should read -- an --.

Column 15,
Line 20, "referent" should read -- reference --;
Line 26, "an-ink" should read -- an ink --;
Line 34, "group 101G" should read -- group 101g --; and
Line 46, "sheet 113" should read -- sheet 103 --.

Column 16,
Line 39, "20" should be deleted.

Column 19,
Line 25, "presented." should read -- prevented. --; and
Line 51, "dispersant; and" should read -- dispersant, --.

Signed and Sealed this

Fourth Day of November, 2003

JAMES E. ROGAN
*Director of the United States Patent and Trademark Office*